(12) United States Patent
Choi

(10) Patent No.: US 10,743,673 B2
(45) Date of Patent: Aug. 18, 2020

(54) STABLE BEDSTEAD WITH DETACHABLE INTERIOR SUPPORT

(71) Applicant: Inno-Sports Co., Ltd., Xiamen (CN)

(72) Inventor: Kwan Jun Choi, Xiamen (CN)

(73) Assignee: Inno-Sports Co., LTD., Xiamen (CN)

( * ) Notice: Subject to any disclaimer, the term of this patent is extended or adjusted under 35 U.S.C. 154(b) by 407 days.

(21) Appl. No.: 15/838,257

(22) Filed: Dec. 11, 2017

(65) Prior Publication Data

US 2018/0192778 A1    Jul. 12, 2018

(30) Foreign Application Priority Data

Jan. 10, 2017  (CN) ..................... 2017 2 0024388 U

(51) Int. Cl.
| A47C 19/00 | (2006.01) |
|---|---|
| F16B 12/56 | (2006.01) |
| A47C 19/02 | (2006.01) |
| A47C 19/12 | (2006.01) |

(52) U.S. Cl.
CPC .......... *A47C 19/005* (2013.01); *A47C 19/025* (2013.01); *A47C 19/027* (2013.01); *A47C 19/12* (2013.01); *A47C 19/122* (2013.01); *F16B 12/56* (2013.01)

(58) Field of Classification Search
CPC ....... A47C 19/00; A47C 19/005; A47C 19/02; A47C 19/021; A47C 19/024; A47C 19/025; A47C 19/027; A47C 19/12; A47C 19/122; F16B 12/54; F16B 12/56; A47D 13/063
See application file for complete search history.

(56) References Cited

U.S. PATENT DOCUMENTS

| 5,656 A | 7/1848 | Hinckley |
|---|---|---|
| 13,034 A | 6/1855 | Hesz |
| 246,028 A | 8/1881 | Meyer |
| 489,229 A | 1/1893 | McClintock |
| 544,615 A | 8/1895 | Fraser |
| 683,264 A | 9/1901 | Flemister |
| 930,340 A * | 8/1909 | Berry .................. A47C 19/025 5/305 |

(Continued)

FOREIGN PATENT DOCUMENTS

| CN | 204670760 U | 9/2015 |
|---|---|---|
| WO | WO 2013056207 A1 | 4/2013 |

OTHER PUBLICATIONS

Screen captures from YouTube video clip entitled "Zinus I Easy to Assemble Smartbase (Official)," uploaded on Apr. 6, 2016 by user "Zinus", retrieved from Internet: <https://www.youtube.com/watch?v=lknPMnJRtWc> (Year: 2016).

*Primary Examiner* — David R Hare
(74) *Attorney, Agent, or Firm* — Morgan, Lewis, & Bockius LLP

(57) ABSTRACT

A bedstead includes a frame, an interior support removably coupled with the frame, and outer legs supporting the frame when the bedstead is set up. The interior support includes an inner leg, first connectors disposed circumferentially around the inner leg and connecting bars. Each connecting bar has one end pivotally connected with the inner leg through a first connector, and the other end to be removably coupled with the frame. When in use, the first connector restricts the movement, in particular, the rotation of the connecting bar, and thus enhances the overall structural stability of the bedstead.

19 Claims, 6 Drawing Sheets

(56) References Cited

U.S. PATENT DOCUMENTS

| | | | |
|---|---|---|---|
| 1,304,419 A | 5/1919 | Van Volkenburg | |
| 1,427,020 A | 8/1922 | Rooks | |
| 1,781,807 A | 11/1930 | De Leon | |
| 1,798,546 A | 3/1931 | Lillibridge | |
| 2,492,070 A * | 12/1949 | Stone | A47C 19/025 5/238 |
| 3,768,106 A | 10/1973 | Fitzgerald | |
| 3,842,451 A | 10/1974 | McCormick | |
| 4,263,683 A | 4/1981 | Knoke | |
| 4,536,904 A * | 8/1985 | Whitehead | A47C 19/005 5/201 |
| 4,638,517 A | 1/1987 | Yang | |
| 4,811,437 A * | 3/1989 | Dillner | A47D 13/063 5/99.1 |
| 5,819,342 A * | 10/1998 | Williams | A47D 13/063 5/99.1 |
| 5,937,457 A * | 8/1999 | Wang | A47D 13/063 5/98.1 |
| 6,295,667 B1 * | 10/2001 | Cheng | A47D 13/063 5/99.1 |
| 6,473,919 B1 * | 11/2002 | Wang | A47D 13/063 5/98.1 |
| 6,510,569 B1 * | 1/2003 | Hu | A47D 13/063 5/93.1 |
| 7,073,218 B2 * | 7/2006 | Polevoy | A47C 19/02 5/201 |
| 7,757,314 B2 | 7/2010 | Yul | |
| 7,836,530 B2 * | 11/2010 | Thorne | A47D 13/063 5/93.1 |
| 8,006,330 B2 | 8/2011 | Lee | |
| 8,051,508 B2 * | 11/2011 | Yu | A47D 13/063 403/102 |
| 8,966,679 B2 * | 3/2015 | Mendes | A47D 13/061 5/93.1 |
| 8,978,176 B1 * | 3/2015 | Oh | A47C 19/005 5/200.1 |
| 9,155,402 B1 | 10/2015 | Whitman | |
| 10,034,551 B2 | 7/2018 | Hull | |
| 2005/0039258 A1 | 2/2005 | Gavela Vazquez | |
| 2010/0138994 A1 | 6/2010 | Lee | |
| 2010/0299831 A1 * | 12/2010 | Lee | A47C 19/126 5/202 |
| 2011/0073147 A1 | 3/2011 | Choi | |
| 2012/0304380 A1 * | 12/2012 | Jin | A47C 19/126 5/400 |
| 2013/0117932 A1 | 5/2013 | Stewart | |
| 2013/0291300 A1 | 11/2013 | Bly | |
| 2015/0284974 A1 | 10/2015 | Choi | |
| 2016/0143447 A1 | 5/2016 | Hull | |
| 2016/0198860 A1 | 7/2016 | Salermo | |
| 2016/0206112 A1 | 7/2016 | Oh | |
| 2016/0255963 A1 | 9/2016 | Jones | |
| 2016/0316921 A1 * | 11/2016 | Choi | A47C 19/122 |
| 2017/0208954 A1 | 7/2017 | Lee | |
| 2018/0055235 A1 * | 3/2018 | Choi | A47C 19/12 |
| 2018/0092466 A1 | 4/2018 | Harrow | |

* cited by examiner

STABLE BEDSTEAD WITH DETACHABLE INTERIOR SUPPORT

CROSS-REFERENCE TO RELATED APPLICATIONS

The present application claims priority to Chinese Utility Model Application CN 201720024388.8 filed Jan. 10, 2017. The disclosure of the application is incorporated herein for all purposes by reference in its entirety.

FIELD OF THE INVENTION

The present invention generally relates to bedsteads, and more particularly, relates to stable bedsteads with detachable interior supports.

BACKGROUND

Bed is a necessity of daily life. People spend at least one fourth of their time on bed. In addition to sleeping, people often watch TVs and read books on bed. Sometimes, people even work on bed. Currently, there exists a variety of bedsteads in the market. Among them, one popular in Europe and North America includes a central vertical support and a plurality of bars coupled with the central vertical support. In the existing design, each bar is rotatable with respect to the central support up to about 180 degrees. As a result, the existing bedstead sometimes shakes or vibrates, and is unstable when in use.

Given the current state of the art, there remains a need for bedsteads that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present invention provides bedsteads that are stable, easy to assemble and disassemble, and convenient to transport, carry and store.

In various exemplary embodiments, the present invention provides a bedstead including a frame, an interior support and a plurality of outer legs. When the bedstead is set up, the frame defines an interior; the interior support is disposed in the interior defined by the frame and removably coupled with the frame; and the plurality of outer legs is coupled with the frame and supporting the frame.

The interior support includes an inner leg and a plurality of first connectors disposed circumferentially around the inner leg at an upper end portion of the inner leg. Each first connector includes a first side segment and a second side segment, each having an inner edge fixedly coupled with the upper end portion of the inner leg. The first and second side segments are spaced apart to form a first slot. Each first connector also includes an upper segment connecting an upper edge of the first side segment with an upper edge of the second side segment. The first side, second side and upper segments are integrally formed with each other.

The interior support also includes a plurality of connecting bars, each having a first end portion and a second end portion. The first end portion of each connecting bar is received in the first slot of a corresponding first connector in the plurality of first connectors and pivotally connected with the corresponding first connector. The second end portion of the connecting bar is removably connected with the frame. The upper segment of the corresponding first connector prevents the connecting bar from rotating beyond an unfolded position.

In some exemplary embodiments, the upper segment of the corresponding first connector is disposed away from the inner leg such that an opening is formed between the inner leg and the upper segment to allow rotation of the connecting bar between a folded position and the unfolded position. In an exemplary embodiment, the connecting bar at the unfolded position is substantially perpendicular to the inner leg.

In some exemplary embodiments, the inner leg is disposed in a central portion of the interior defined by the frame when the bedstead is set up.

In some exemplary embodiments, a respective connecting bar in the plurality of connecting bars includes a clip at the second end portion of the respective connecting bar. The frame includes a second slot disposed at an internal side of the frame to removably couple with the clip at the second end portion of the respective connecting bar. In an exemplary embodiment, the clip is tapered.

In an exemplary embodiment, the plurality of first connectors includes four first connectors each disposed on a side of the inner leg, and the plurality of connecting bars includes two lateral connecting bars and two longitudinal connecting bars each connected with one of the four first connectors.

In many exemplary embodiments, the bedstead further includes a plurality of crossing bars, each having a first end portion removably coupled with one of the connecting bars of the interior support and a second end portion removably coupled with the frame. In some exemplary embodiments, the plurality of connecting bars includes a first lateral connecting bar, a second lateral connecting bar, a first longitudinal connecting bar, and a second longitudinal connecting bar. The frame includes a first lateral frame bar, a second lateral frame bar, a first longitudinal frame bar and a second longitudinal frame bar. When the bedstead is set up, the first lateral frame bar and the second lateral frame bar are disposed at a head side and a foot side of the bedstead respectively, and the first longitudinal frame bar and the second longitudinal frame bar are disposed at a left side and a right side of the bedstead respectively. Each crossing bar in the plurality of crossing bars has a first end portion removably coupled with one of the first lateral connecting bar, the second lateral connecting bar, the first longitudinal connecting bar and the second longitudinal connecting bar, and a second end portion removably coupled with one of the first lateral frame bar, the second lateral frame bar, the first longitudinal frame bar, and the second longitudinal frame bar.

In some exemplary embodiments, the bedstead further includes a plurality of "U"-shaped first support bearings and a plurality of "U"-shaped second support bearings. Each first support bearing is disposed on a side of one of the first lateral connecting bar, the second lateral connecting bar, the first longitudinal connecting bar and the second longitudinal connecting bar, and configured to detachably couple with the first end portion of a crossing bar in the plurality of crossing bars. Each second support bearing is disposed on an internal side of one of the first lateral frame bar, the second lateral frame bar, the first longitudinal frame bar, and the second longitudinal frame bar, and configured to detachably couple with the second end portion of a crossing bar in the plurality of crossing bars. In an exemplary embodiment, each first support bearing is disposed on the side of the first or second longitudinal connecting bar, and each second support bearing is disposed on the internal side of the first or second longitudinal frame bar. When the bedstead is set up, the plurality of crossing bars is disposed in a common direction substantially parallel to the first or second lateral frame bar.

In many exemplary embodiments, the frame includes a first lateral frame bar and a second lateral frame bar, each including a first lateral segment and a second lateral segment. The frame also includes a first longitudinal frame bar and a second longitudinal frame bar, each including a first longitudinal segment and a second longitudinal segment. The frame further includes a plurality of second connectors, each pivotally connecting the first and second lateral segments of the first or second lateral frame bar, or pivotally connecting the first and second longitudinal segments of the first or second longitudinal frame bar. When the bedstead is set up, the first lateral frame bar and the second lateral frame bar are disposed at a head side and a foot side of the bedstead respectively, the first longitudinal frame bar and the second longitudinal frame bar are disposed at a left side and a right side of the bedstead respectively, and adjacent bars in the first lateral frame bar, the second lateral frame bar, the first longitudinal frame bar, and the second longitudinal frame bar are connected with each other at their ends.

In some exemplary embodiments, each of the first lateral frame bar, the second lateral frame bar, the first longitudinal frame bar, and the second longitudinal frame bar is tubular.

In some exemplary embodiments, the plurality of outer legs includes a plurality of first legs, each first leg coupled with a corresponding second connector in the plurality of second connectors.

In some exemplary embodiments, the bedstead further includes a plurality of "U"-shaped brackets, each pivotally coupled with one of the first lateral, second lateral, first longitudinal and second longitudinal frame bars at a position adjacent to an end portion of the frame bar. The plurality of outer legs includes a plurality of second legs. Each respective second leg in the plurality of second legs is fixedly coupled with a corresponding "U"-shaped bracket in the plurality of "U"-shaped brackets.

In some exemplary embodiments, the bedstead further includes a fastening member to fasten the corresponding "U"-shaped bracket with the first or second lateral frame bar when the respective second leg is deployed, thereby maintaining the respective second leg at its deployed position. In an exemplary embodiment, the fastening member is any one selected from the group consisting of a spring buckle, a bolt, and a screw. The fastening of the corresponding "U"-shaped bracket with the first or second lateral frame bar is through a first hole formed on the corresponding "U"-shaped bracket, or through a first hole formed on the corresponding "U"-shaped bracket and a second hole formed on a wall of the first or second lateral frame bar adjacent the end portion of the first or second lateral frame bar.

In some exemplary embodiments, the first or second lateral frame bar is tubular, and the fastening member includes an elastic member disposed inside of the first or second lateral frame bar adjacent the end portion of the frame bar. A positioning piece is coupled or formed with the elastic member at a position adjacent an end of the elastic member. When the first hole of the corresponding "U"-shaped bracket and the second hole of the first or second lateral frame bar are aligned with each other, the elastic member pushes the positioning piece outwardly and into the first and second holes, thereby restricting the corresponding "U"-shaped bracket, along with the second leg fixedly coupled with the corresponding "U"-shaped bracket, from rotating with respect to the first or second lateral frame bar.

In an exemplary embodiment, the corresponding "U"-shaped bracket has an upper edge bent toward the interior defined by the frame to form a guide to help pushing the positioning piece inwardly and disengaging the positioning piece from the first hole of the corresponding "U"-shaped bracket, thereby allowing the corresponding "U"-shaped bracket, along with the second leg fixedly coupled with the corresponding "U"-shaped bracket, to rotate with respect to the first or second lateral frame bar.

The bedsteads of the present invention have other features and advantages that will be apparent from, or are set forth in more detail in, the accompanying drawings, which are incorporated herein, and the following Detailed Description, which together serve to explain certain principles of exemplary embodiments of the present invention.

BRIEF DESCRIPTION OF THE DRAWINGS

The accompanying drawings, which are incorporated into and constitute a part of this specification, illustrate one or more exemplary embodiments of the present invention and, together with the Detailed Description, serve to explain the principles and implementations of exemplary embodiments of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present invention are described in the context of bedsteads. In general, a bedstead of the present invention includes a frame defining an interior and an interior support disposed in the interior and removably coupled with the frame. An interior support of the present invention generally includes an inner leg, and a plurality of connecting bars coupled with the inner leg through a plurality of first connectors disposed at the inner leg. The plurality of first connectors is configured such that when in use, it restricts the movement, in particular, the rotation of the plurality of connecting bars, and thus enhances the overall structural stability of the bedstead.

Figure 1:
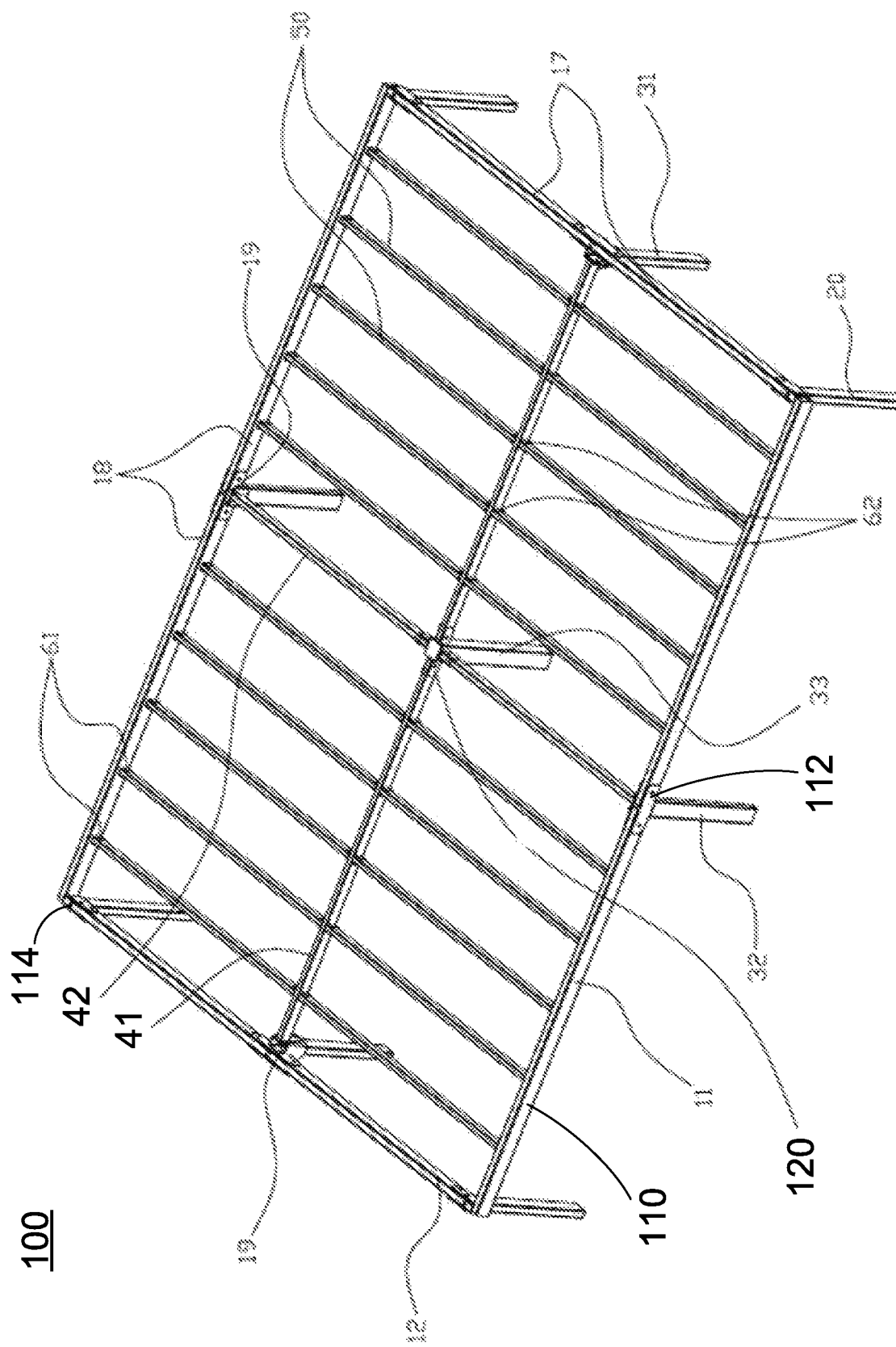
FIG. 1 is a schematic view illustrating an exemplary bedstead in accordance with some exemplary embodiments of the present invention.

Referring now to FIG. 1, there is depicted exemplary bedstead 100 in accordance with some embodiments of the present invention. As shown, bedstead 100 includes a frame such as frame 110 and an interior support such as interior support 120. Interior support 120 is disposed in the interior defined by frame 110 when bedstead 100 is set up, e.g., the interior support is surrounded by the frame when viewed from the top of the bedstead when the bedstead is assembled, deployed and/or unfolded. The bedstead can be made of various materials including but not limited to metals such as steel, plastics and woods. It can be of various sizes including but not limited to twin, full, queen and king sizes, and of various shapes including but not limited to rectangles and squares. By way of example, a substantially rectangular bedstead is illustrated.

In many embodiments, frame 110 is made of a plurality of bars connected to each other at their adjacent ends. For instance, FIG. 1 illustrates frame 110 made of first and second longitudinal frame bars 11, and first and second lateral frame bars 12. When the bedstead is set up, the first lateral frame bar and the second lateral frame bar are disposed at a head side and a foot side of the bedstead respectively. The first longitudinal frame bar and the second longitudinal frame bar are disposed at a left side and a right side of the bedstead respectively. Adjacent ends of the longitudinal and lateral frame bars are connected with each other. The connection of longitudinal frame bars 11 and lateral frame bars 12 can be fixed or detachable. An example of assemble and disassemble frame is disclosed in Applicant's U.S. patent application Ser. No. 15/693,044, the disclosure of the application is incorporated herein for all purposes by reference in its entirety.

In some embodiments, longitudinal frame bar 11 is composed of two or more segments pivotally connected with each other such that they can be folded for storage, transportation or other purposes. Similarly, in some embodiments, lateral frame bar 12 is composed of two or more segments. In the illustrated embodiment, longitudinal frame bar 11 is composed of first and second longitudinal segments 18, and lateral frame bar 12 is composed of first and second lateral segments 17. The adjacent ends of longitudinal segments 18 or lateral segments 17 are pivotally connected with each other through connector 112. In some embodiments, a length of the first lateral segment is substantially equal to a length of the second lateral segment, and a length of the first longitudinal segment is substantially equal to a length of the second longitudinal segment.

In some embodiments, one or more frame bars are tubular, e.g., formed of a hollow tube. In an embodiment, each of the first lateral frame bar, the second lateral frame bar, the first longitudinal frame bar, and the second longitudinal frame bar is tubular.

Figure 2:
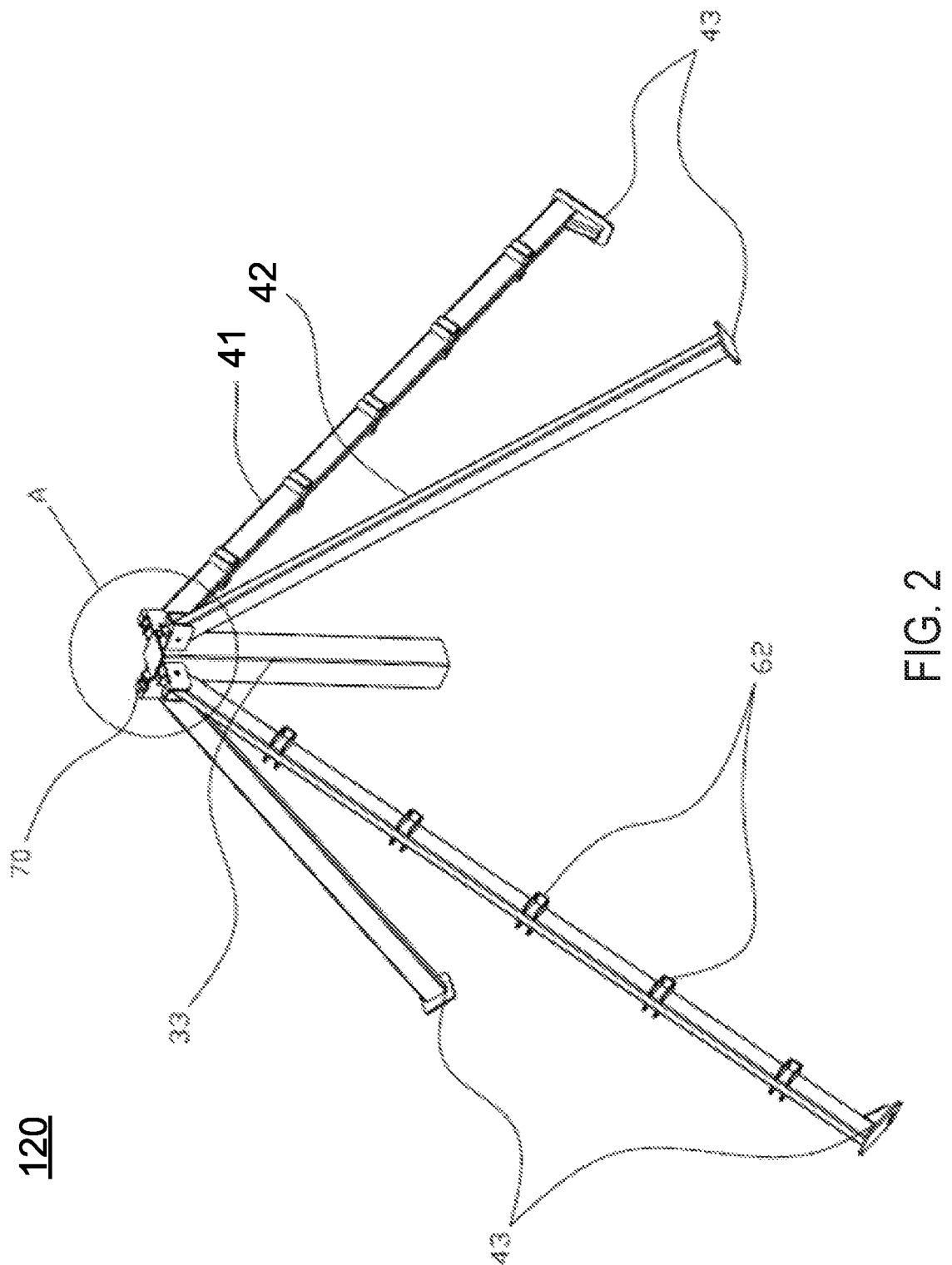
FIG. 2 is a schematic view illustrating an exemplary interior support of a bedstead in accordance with some exemplary embodiments of the present invention.
Figure 3:
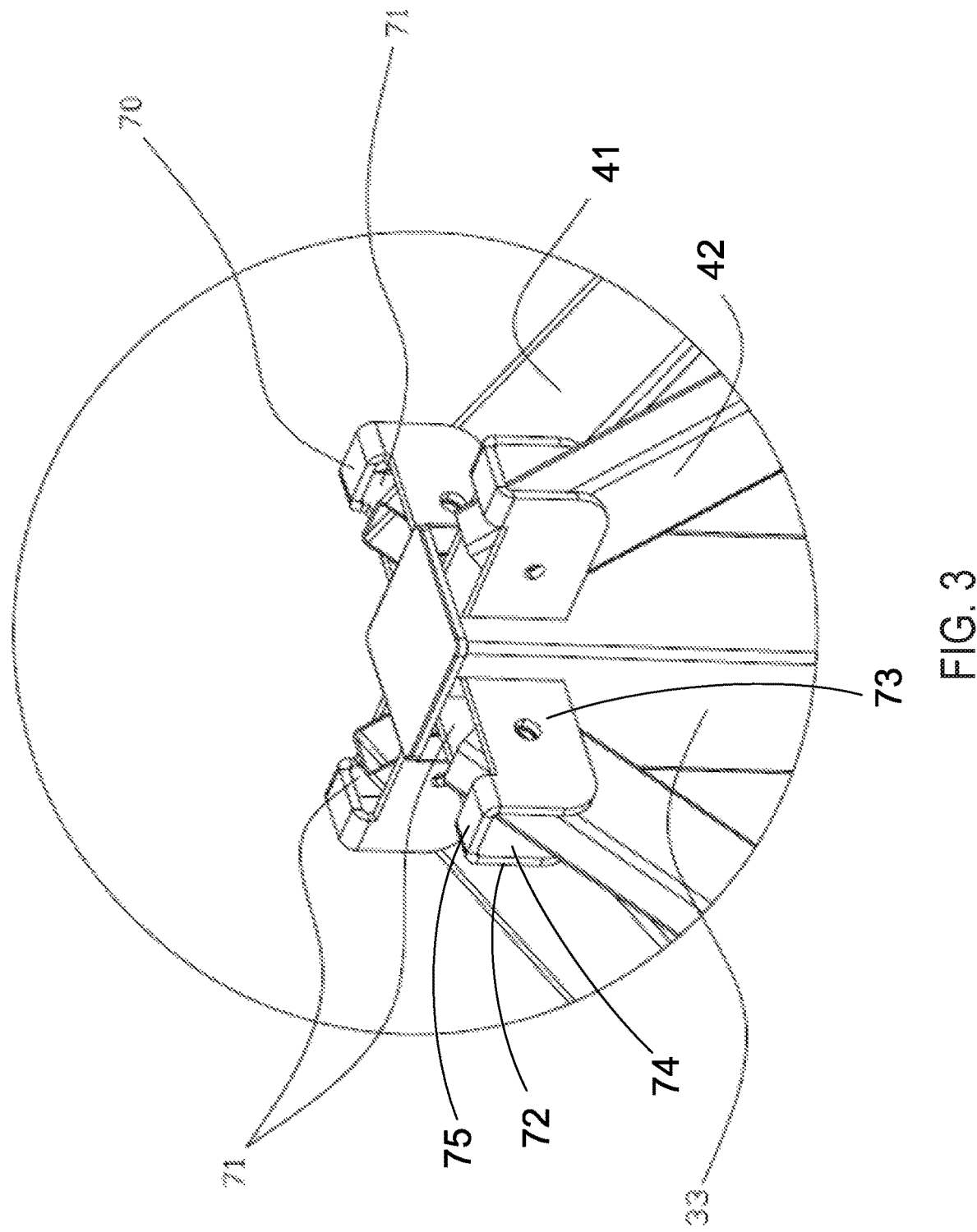
FIG. 3 is an enlarged view taken along circle A in FIG. 2.

Referring to FIGS. 1-3, in many embodiments, interior support 120 includes a vertical support such as inner leg 33, a plurality of connectors such as first connectors 70, and a plurality of bars such as connecting bars 41, 42. The interior support can be symmetrical, with the inner leg disposed in the center of the interior when bedstead 100 is set up. The interior support can also be asymmetrical, e.g., two connecting bars 41 having different lengths, or two connecting bars 42 having different lengths, or both.

The plurality of first connectors 70 is disposed circumferentially, and in some embodiments evenly spaced, around the inner leg at its upper end portion. For instance, in the illustrated embodiment, four first connectors 70 are shown, with each disposed on a side of inner leg 33 and collectively forming a cross "+"-shape. It should be noted that an interior support of the present invention can have two, three, or more than four first connectors.

In some embodiments, first connector 70 includes first side segment 72 and second side segment 73. Each of the first and second side segments is fixedly coupled with the upper end portion of inner leg 33, for instance by welding, snap-fitting or the like the inner edge of the side segment on the inner leg. The first and second side segments are spaced apart and first slot 74 is formed in between.

First connector 70 also includes upper segment 75 disposed between the first and second side segments, and connecting an upper edge of the first side segment with an upper edge of the second side segment as illustrated in FIG. 3. In some embodiments, upper segment 75 is disposed away from the inner leg (e.g., not directly connected with the inner leg) to form an opening such as opening 71 in between. In some embodiments, the first side, second side and upper segments are integrally formed with each other, for instance, by bending a metal sheet or molding a plastic.

The plurality of connecting bars is pivotally connected with the inner leg through the plurality of first connectors. For instance, FIGS. 2 and 3 illustrate first and second longitudinal connecting bars 41 and first and second lateral connecting bars 42, each having an end portion received in first slot 74 and pivotally connected with first connector 70. In some embodiments, the end portion of the connecting bar is pivotally connected with the first and second segments of the first connector, for instance, by a pin, a bolt, or the like. It should be noted that the number of connecting bars can but does not necessarily have to match with the number of first connectors. For instance, an interior support can include any number of first connectors (e.g., four first connectors), and any number of connecting bars (e.g., two, three or four connecting bars) as long as the number of the connecting bars does not exceed the number of the first connectors.

The pivotal connection allows the connecting bar to rotate with respect to the inner leg. With opening 71 to provide a free space for the end portion of the connecting bar, the connecting bar can rotate with respect to the inner leg between a folded position (e.g. when the connecting bar is folded onto the inner leg) and an unfolded position (e.g., when the connecting bar is substantially perpendicular to the inner leg). When it rotates to the unfolded position, the connecting bar comes into contact with upper segment 75, which serves as a stopper and prevents the connecting bar from rotating beyond this unfolded position. As a result, the bedstead is stable when in use.

The other end portion of the connecting bar is configured to be removably coupled with the frame. For instance, in some embodiments, the other end portion of the connecting bar is provided (e.g., formed or coupled) with an engaging feature such as clip 43, and accordingly, frame 110 is provided with an engaging feature such as second slot 19 to receive clip 43. In an embodiment, second slot 19 is provided at a position at which connector 112 is located. In an embodiment, connector 112 is composed of second slot 19. In some embodiments, the clip is tapered to facilitate easy insertion of the clip into the corresponding second slot.

In many embodiments, bedstead 100 further includes a plurality of crossing bars such as crossing bars 50 removably coupled with the interior support and the frame. In some embodiments, each crossing bar 50 has a first end portion removably coupled with one of the connecting bars (e.g., any one of lateral and longitudinal connecting bars 41, 42) of the interior support and a second end portion removably coupled with one of the frame bars (e.g., a corresponding longitudinal frame bar 11 or a corresponding lateral frame bar 12).

In some embodiments, when the bedstead is set up, the plurality of crossing bars is disposed in a common direction substantially parallel to the first or second lateral frame bar 12 as illustrated in FIG. 1. It should be noted, however, that the plurality of crossing bars can be arranged in a variety of different ways. For instance, the plurality of crossing bars can be disposed in a common direction substantially parallel to the first or second longitudinal frame bar 11, or not in a common direction but with some substantially parallel to the first or second longitudinal frame bar 11 and some substantially parallel to the first or second lateral frame bar 12. It should also be noted that the plurality of crossing bars can be but does not necessarily have to be distributed evenly and uniformly.

To removably or detachably couple crossing bars 50 with interior support 120, in some embodiments, a plurality of "U"-shaped first support bearings such as first support bearings 62 is provided at the interior support. In an embodiment, each first support bearing 62 is disposed on a side of a lateral or longitudinal connecting bar (e.g., on a side wall of the connecting bar that faces the frame when the bedstead is set up for use) and fixedly coupled with the connecting bar, e.g., by welding or the like. By way of example, FIGS. 1 and 2 illustrates the plurality of first support bearings disposed on both sides of the two longitudinal connecting bars.

Similarly, to removably or detachably couple crossing bars 50 with frame 110, in some embodiments, a plurality of "U"-shaped second support bearings such as second support bearings 61 is provided at the frame, e.g., on one or more of the lateral and longitudinal frame bars. In the illustrated embodiment, the plurality of "U"-shaped second support bearings is disposed on an internal side of the two longitudinal frame bars. The second support bearings can be configured the same as or differently than the first support bearings in terms of shape, size, or the like.

Alternatively, in an embodiment, the "U"-shaped first support bearings is disposed on the sides of the first or second lateral connecting bar, and the "U"-shaped second support bearings is disposed on the internal side of the first or second lateral frame bar. When the bedstead is set up, the plurality of crossing bars is disposed in a common direction substantially parallel to the first or second longitudinal frame bar.

In various embodiments, bedstead 100 further includes a plurality of vertical supports such as outer legs coupled with the frame and supporting the frame when the bedstead is set up. In some embodiments, the plurality of outer legs includes a plurality of first legs 31, 32, each coupled with second connector 112 that pivotally connects the segments of the lateral or longitudinal frame bar. In an embodiment, the first leg and the second connector are integrally formed or fixedly coupled with each other.

In some embodiments, the plurality of outer legs also includes a plurality of second legs 20 coupled with the lateral or longitudinal frame bar at a position adjacent an end portion of the lateral or longitudinal frame bar, for instance, at a position within 4-inch, 6-inch, 8-inch, 10-inch, or 12-inch distance from the end of the lateral or longitudinal frame bar. In some embodiments, a plurality of brackets such as bracket 114 is provided to couple the second legs with the frame. Bracket 114 is configured to allow a second leg to fold and unfold with respect to the frame, and prevent the leg from rotating when deployed in an unfolded state. The brackets can be disposed at and coupled with any one of the lateral or longitudinal frame bars of the frame. By way of example, FIG. 1 illustrates each bracket 114 pivotally coupled with first or second lateral frame bar 12 at a position adjacent to an end portion of the first or second lateral frame bar.

Figure 4:
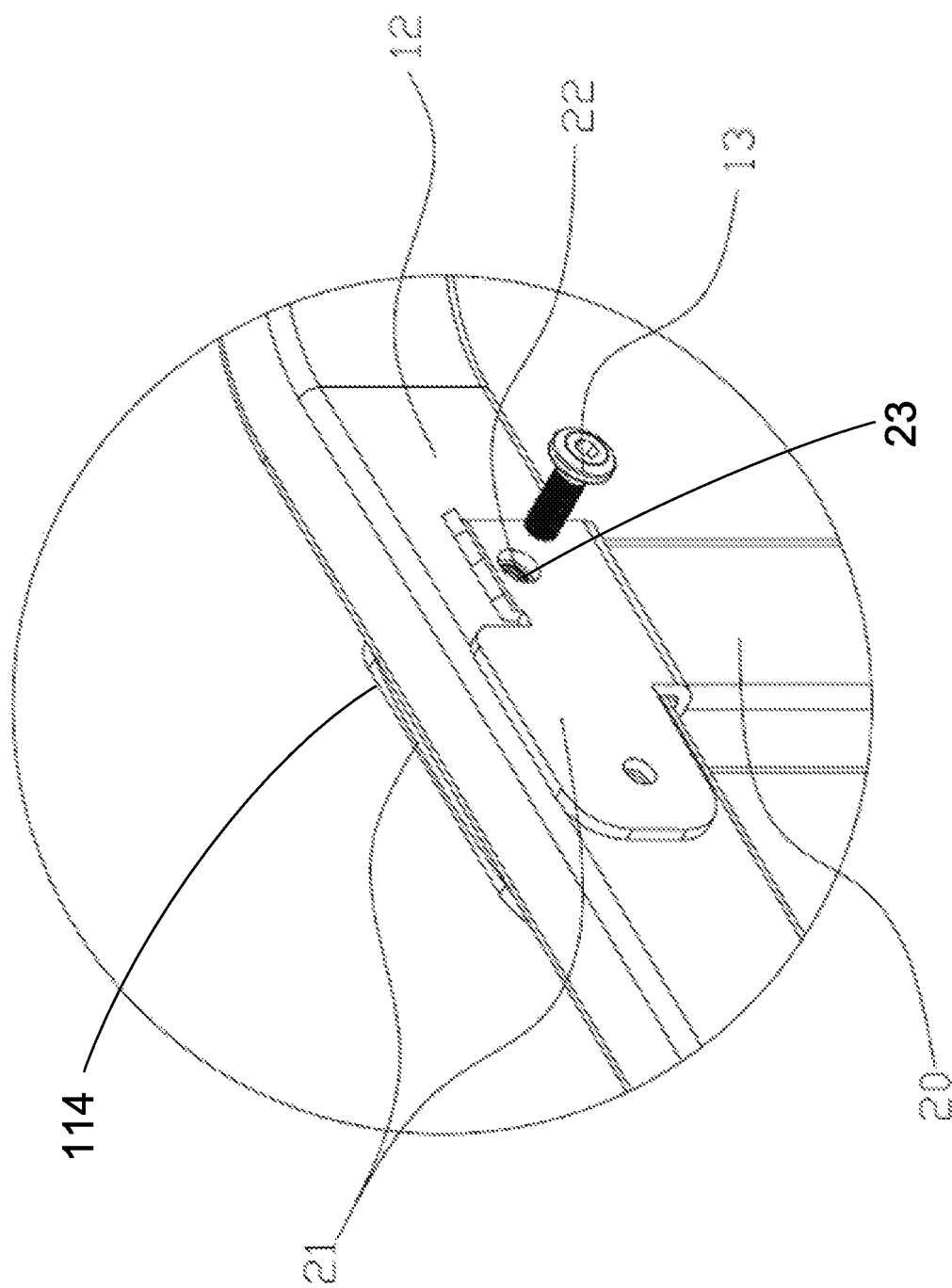
FIG. 4 is a schematic view illustrating a connection between a leg and the frame in accordance with some exemplary embodiments of the present invention.

Referring to FIG. 4, in some embodiments, bracket 114 has a substantial "U"-shape with two sides 21, one disposed at the interior side and one at the exterior side of the first or second lateral frame bar 12. Second leg 20 is fixedly coupled or integrally formed with the lower or middle portion of the bracket. The two sides of the bracket is pivotally connected (e.g., hinged) with the first or second lateral frame bar 12 to allow the second leg to fold and unfold with respect to the lateral frame bar.

In some embodiments, first hole 22 is formed on a side of the bracket and is spaced away from a pivot point at which the bracket is connected with the frame bar. In an embodiment, corresponding to first hole 22, second hole 23 is formed on a wall of the frame bar adjacent its end portion. Through the first hole or through both of the first and second holes, a fastening member such as fastening member 13 is used to fix the bracket with the frame bar when the second leg is unfolded or deployed, thereby maintaining the second leg at its deployed position and stabilizing the bedstead. Fastening member 13 can be any suitable fasteners including but not limited to a spring buckle, a bolt, and a screw such as a bow-tie shaped screw.

Figure 5:
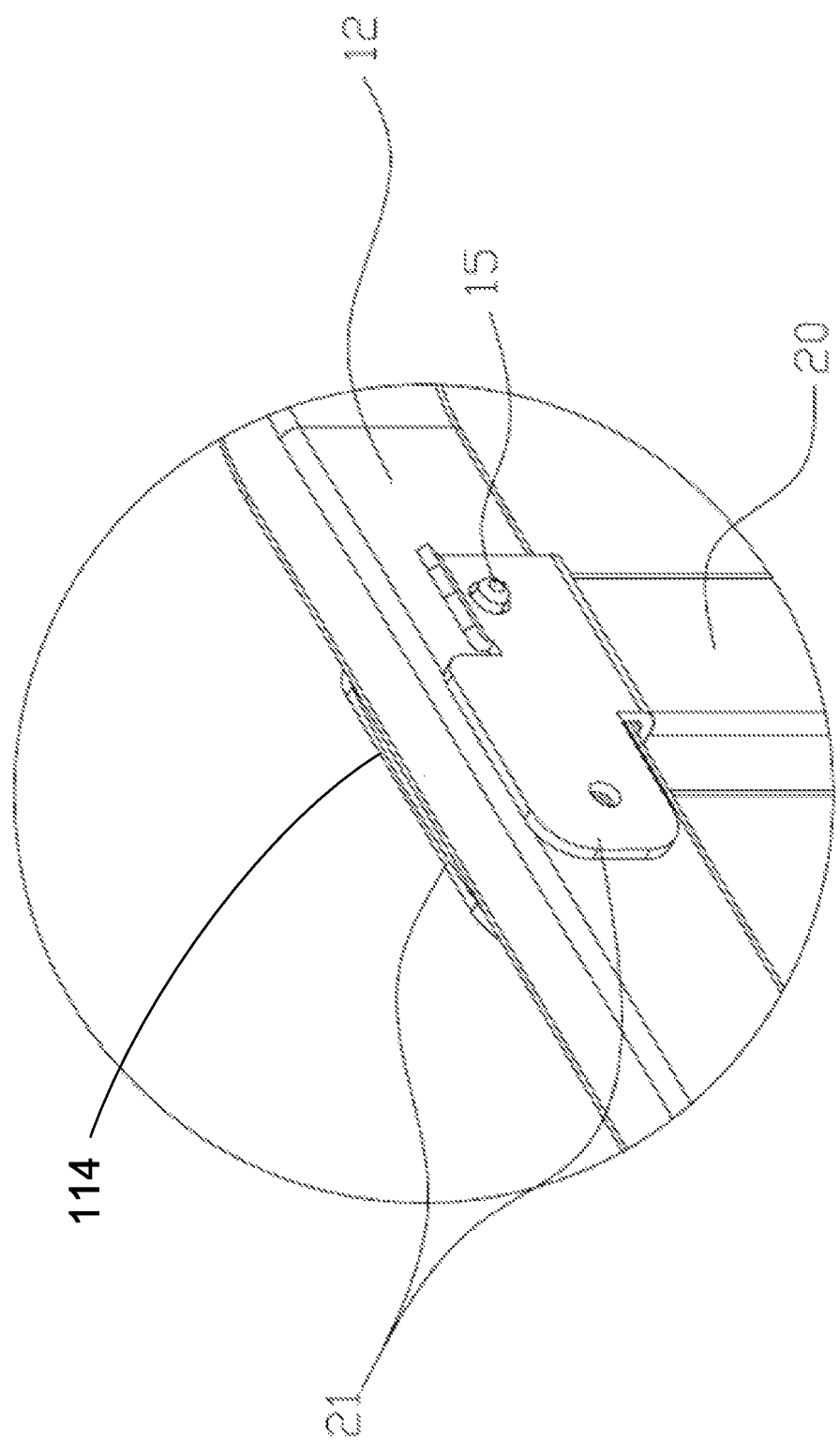
FIG. 5 is a schematic view illustrating an alternative connection between a leg and the frame in accordance with some exemplary embodiments of the present invention.
Figure 6:
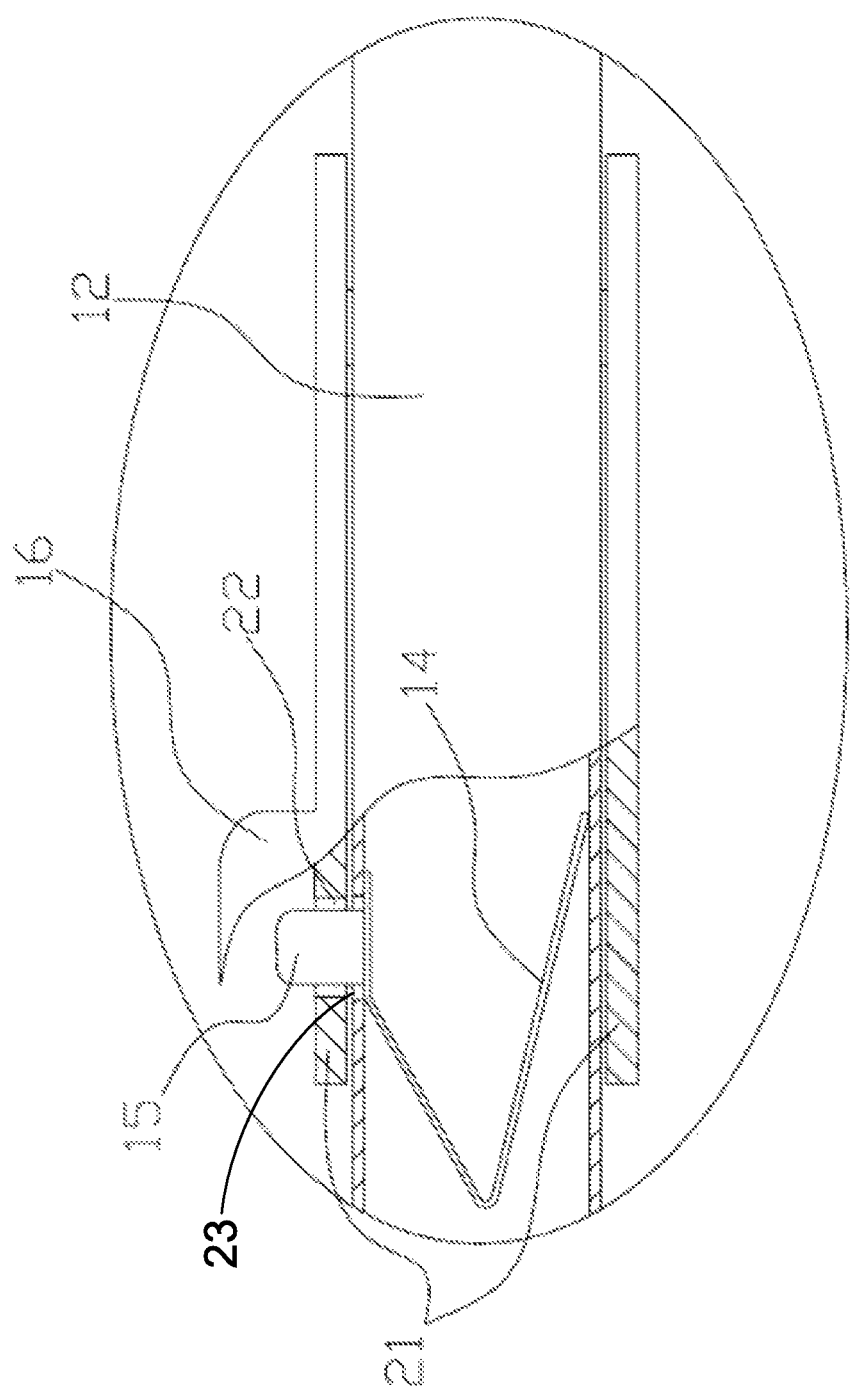
FIG. 6 is a schematic and partially cutout view schematic view illustrating a fastening member of FIG. 5.

Alternatively, in some embodiments, a fastening member with an elastic member and a positioning piece is used to fix the bracket with the frame bar when the second leg is unfolded or deployed. For instance, FIGS. 5 and 6 illustrate a fastening member including elastic member 14 and positioning piece 15. The positioning piece is coupled or formed with the elastic member at a position adjacent an end of the elastic member. Elastic member 14 is disposed inside of the frame bar with positioning piece 15 toward second hole 23. When the second hole of the frame bar and the first hole of the corresponding "U"-shaped bracket are aligned with each other, the elastic member pushes the positioning piece outwardly and into the first hole. As a result, the corresponding "U"-shaped bracket, along with the second leg fixedly coupled with the corresponding "U"-shaped bracket, is restricted from rotating with respect to the frame bar.

In an embodiment, the corresponding "U"-shaped bracket has an upper edge bent toward the interior defined by the frame to form a guide such as guide 16. When folding is desired, guide 16 helps to push positioning piece 15 inwardly, disengaging it from the first hole of the corresponding "U"-shaped bracket. As a result, the corresponding "U"-shaped bracket, along with the second leg fixedly coupled with the corresponding "U"-shaped bracket, is allowed to rotate with respect to the frame bar.

The present invention, however, is not limited to the above configuration(s). For instance, the lateral and longitudinal connecting bars can be, but do not necessarily need to be, substantially perpendicular to each other. Further, these components can be, but do not necessarily need to be, substantially parallel to the lateral and longitudinal frame bars of the frame as in the illustrated embodiment. Also, the support bars can be, but do not necessarily need to be, in a common direction such that each support bar extends along a same direction as an adjacent support bar; they can be disposed in the frame in any suitable direction(s), and they can be connected to any one of the lateral and longitudinal bars of the frame and the interior support. Further, support bearings can be disposed at any one of the lateral and longitudinal bars of the frame and the interior support. For example, in an embodiment, each first support bearing is disposed on a side of one of the first lateral connecting bar, second lateral connecting bar, first longitudinal connecting bar, and the second longitudinal connecting bar, and each second support bearing is disposed on an internal side of one of the first lateral bar, second lateral bar, first longitudinal bar, and the second longitudinal bar.

To disassemble a bedstead of the present disclosure, remove the cross bars from the support bearings. Then, disengage the clips of the connecting bars from the slots of the frame to separate the interior support from the frame. Rotate the connecting bars to fold the interior support. For a frame made of lateral and longitudinal frame bars, separate the lateral and longitudinal frame bars from each other. For a frame bar made of segments and coupled with a first leg (e.g., the longitudinal frame bar), fold the frame bar along with the first leg. For a frame bar made of segments and coupled with both first and second legs (e.g., the lateral frame bar), rotate the second leg toward the frame bar and then fold the frame bar along with the first and second legs. Assembling a bedstead can be accomplished by reversing the processes.

As disclosed herein, bedsteads of the present invention are advantageous. First, the first connector is configured with an upper segment, which serves as a stopper and prevents the connecting bar from rotating beyond its unfolded position when the bedstead is in use. As such, the overall structural stability of the bedstead is improved. Second, through the bracket and the fastening member, the second leg is fixedly coupled with the frame when deployed. As such, it would not accidentally turn or collapse when in use. Third, a bedstead of the present invention is easy to assemble and disassemble. Forth, various components (e.g., the interior support) of the bedstead are foldable, making the bedstead convenient for storage, transportation or other purposes.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. The term "and/or" refers to and encompasses any and all possible combinations of one or more of the associated listed items. The terms "includes" and/or "comprising," when used in this specification, specify the presence of stated features, integers, steps, operations, elements, and or components, but do not preclude the presence or addition of one or more other features, integers, steps, operations, elements, components, and/or groups thereof. It will be understood that the terms "inner", "outer", "inwardly", "outwardly", "interior", "exterior", "left", "right", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first lateral bar could be termed a second lateral bar, and, similarly, a second lateral bar could be termed a first lateral bar, without changing the meaning of the description, so long as all occurrences of the "first lateral bar" are renamed consistently and all occurrences of the "second lateral bar" are renamed consistently.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of the invention be defined by the Claims appended hereto and their equivalents.

What is claimed is:

1. A bedstead comprising:
 a frame defining an interior when the bedstead is set up;
 an interior support disposed in the interior defined by the frame and removably coupled with the frame when the bedstead is set up, the interior support comprising:
  an inner leg;
  a plurality of first connectors disposed circumferentially around the inner leg at an upper end portion thereof, each first connector comprising:
   a first side segment and a second side segment, each having an inner edge fixedly coupled with the upper end portion of the inner leg, wherein the first and second side segments are spaced apart to form a first slot; and
   an upper segment connecting an upper edge of the first side segment with an upper edge of the second side segment, wherein the first side, second side and upper segments are integrally formed with each other; and
  a plurality of connecting bars, each having a first end portion received in the first slot of a corresponding first connector in the plurality of first connectors and pivotally connected with the corresponding first connector, and a second end portion removably connected with the frame, wherein the upper segment of the corresponding first connector prevents the connecting bar from rotating beyond an unfolded position; and
 a plurality of outer legs coupled with the frame and supporting the frame when the bedstead is set up, wherein:
a respective connecting bar in the plurality of connecting bars comprises a clip at the second end portion thereof; and
the frame comprises a second slot disposed at an internal side of the frame to removably couple with the clip at the second end portion of the respective connecting bar.

2. The bedstead of claim 1, wherein the upper segment of the corresponding first connector is disposed away from the inner leg such that an opening is formed between the inner leg and the upper segment to allow rotation of the connecting bar between a folded position and the unfolded position.

3. The bedstead of claim 1, wherein in the unfolded position, the connecting bar is substantially perpendicular to the inner leg.

4. The bedstead of claim 1, wherein the inner leg is disposed in a central portion of the interior defined by the frame when the bedstead is set up.

5. The bedstead of claim 1, wherein the clip is tapered.

6. The bedstead of claim 1, wherein the plurality of first connectors comprises four first connectors each disposed on a side of the inner leg, and the plurality of connecting bars comprises two lateral connecting bars and two longitudinal connecting bars each connected with one of the four first connectors.

7. The bedstead of claim 1, further comprising:
a plurality of crossing bars, each having a first end portion removably coupled with one of the connecting bars of the interior support and a second end portion removably coupled with the frame.

8. The bedstead of claim 7, wherein:
the plurality of connecting bars comprises a first lateral connecting bar, a second lateral connecting bar, a first longitudinal connecting bar, and a second longitudinal connecting bar;
the frame comprises a first lateral frame bar, a second lateral frame bar, a first longitudinal frame bar and a second longitudinal frame bar, wherein when the bedstead is set up, the first lateral frame bar and the second lateral frame bar are disposed at a head side and a foot side of the bedstead respectively, and the first longitudinal frame bar and the second longitudinal frame bar are disposed at a left side and a right side of the bedstead respectively; and
each crossing bar in the plurality of crossing bars has a first end portion removably coupled with one of the first lateral connecting bar, the second lateral connecting bar, the first longitudinal connecting bar and the second longitudinal connecting bar, and a second end portion removably coupled with one of the first lateral frame bar, the second lateral frame bar, the first longitudinal frame bar, and the second longitudinal frame bar.

9. The bedstead of claim 8, further comprising:
a plurality of "U"-shaped first support bearings, each disposed on a side of one of the first lateral connecting bar, the second lateral connecting bar, the first longitudinal connecting bar and the second longitudinal connecting bar, and configured to detachably couple with the first end portion of a crossing bar in the plurality of crossing bars; and
a plurality of "U"-shaped second support bearings, each disposed on an internal side of one of the first lateral frame bar, the second lateral frame bar, the first longitudinal frame bar, and the second longitudinal frame bar, and configured to detachably couple with the second end portion of a crossing bar in the plurality of crossing bars.

10. The bedstead of claim 9, wherein:
each of the "U"-shaped first support bearings is disposed on the side of the first or second longitudinal connecting bar;
each of the "U"-shaped second support bearings is disposed on the internal side of the first or second longitudinal frame bar; and
when the bedstead is set up, the plurality of crossing bars is disposed in a common direction substantially parallel to the first or second lateral frame bar.

11. A bedstead comprising:
a frame defining an interior when the bedstead is set up;
an interior support disposed in the interior defined by the frame and removably coupled with the frame when the bedstead is set up, the interior support comprising:
an inner leg;
a plurality of first connectors disposed circumferentially around the inner leg at an upper end portion thereof, each first connector comprising:
a first side segment and a second side segment, each having an inner edge fixedly coupled with the upper end portion of the inner leg, wherein the first and second side segments are spaced apart to form a first slot and
an upper segment connecting an upper edge of the first side segment with an upper edge of the second side segment, wherein the first side, second side and upper segments are integrally formed with each other; and
a plurality of connecting bars, each having a first end portion received in the first slot of a corresponding first connector in the plurality of first connectors and pivotally connected with the corresponding first connector, and a second end portion removably connected with the frame, wherein the upper segment of the corresponding first connector prevents the connecting bar from rotating beyond an unfolded position; and
a plurality of outer legs coupled with the frame and supporting the frame when the bedstead is set up,
wherein the frame comprises:
a first lateral frame bar and a second lateral frame bar, each comprising a first lateral segment and a second lateral segment; and
a first longitudinal frame bar and a second longitudinal frame bar, each comprising a first longitudinal segment and a second longitudinal segment; and
a plurality of second connectors, each pivotally connecting the first and second lateral segments of the first or second lateral frame bar, or pivotally connecting the first and second longitudinal segments of the first or second longitudinal frame bar,
wherein when the bedstead is set up, the first lateral frame bar and the second lateral frame bar are disposed at a head side and a foot side of the bedstead respectively, the first longitudinal frame bar and the second longitudinal frame bar are disposed at a left side and a right side of the bedstead respectively, and adjacent bars in the first lateral frame bar, the second lateral frame bar, the first longitudinal frame bar, and the second longitudinal frame bar are connected with each other at ends thereof.

12. The bedstead of claim 11, wherein each of the first lateral frame bar, the second lateral frame bar, the first longitudinal frame bar, and the second longitudinal frame bar is tubular.

13. The bedstead of claim 11, wherein the plurality of outer legs comprises a plurality of first legs, each first leg coupled with a corresponding second connector in the plurality of second connectors.

14. The bedstead of claim 11, the bedstead further comprising:
a plurality of "U"-shaped brackets, each pivotally coupled with one of the first lateral, second lateral, first longitudinal and second longitudinal frame bars at a position adjacent to an end portion thereof,
wherein the plurality of outer legs comprises a plurality of second legs, and each respective second leg in the plurality of second legs is fixedly coupled with a corresponding "U"-shaped bracket in the plurality of "U"-shaped brackets.

15. The bedstead of claim 14, further comprising:
a fastening member to fasten the corresponding "U"-shaped bracket with the first or second lateral frame bar when the respective second leg is deployed, through a first hole formed on the corresponding "U"-shaped bracket, thereby maintaining the respective second leg at its deployed position.

16. The bedstead of claim 15, wherein the fastening member is a member selected from the group consisting of a spring buckle, a bolt, and a screw.

17. The bedstead of claim 14, further comprising:
a fastening member to fasten the corresponding "U"-shaped bracket with the first or second lateral frame bar when the respective second leg is deployed, through a first hole formed on the corresponding "U"-shaped bracket and a second hole formed on a wall of the first or second lateral frame bar adjacent the end portion thereof, thereby maintaining the respective second leg at its deployed position.

18. The bedstead of claim 17, wherein the first or second lateral frame bar is tubular, and the fastening member comprises:
an elastic member disposed inside of the first or second lateral frame bar adjacent the end portion thereof; and
a positioning piece coupled or formed with the elastic member at a position adjacent an end of the elastic member,
wherein when the first hole of the corresponding "U"-shaped bracket and the second hole of the first or second lateral frame bar are aligned with each other, the elastic member pushes the positioning piece outwardly and into the first and second holes, thereby restricting the corresponding "U"- shaped bracket, along with the second leg fixedly coupled with the corresponding "U"-shaped bracket, from rotating with respect to the first or second lateral frame bar.

19. The bedstead of claim 17, wherein the corresponding "U"-shaped bracket has an upper edge bent toward the interior defined by the frame to form a guide to help pushing the positioning piece inwardly and disengaging the positioning piece from the first hole of the corresponding "U"-shaped bracket, thereby allowing the corresponding "U"-shaped bracket, along with the second leg fixedly coupled with the corresponding "U"-shaped bracket, to rotate with respect to the first or second lateral frame bar.

* * * * *